United States Patent
Foley et al.

(10) Patent No.: US 11,972,242 B2
(45) Date of Patent: Apr. 30, 2024

(54) RUNTIME ENVIRONMENT OPTIMIZER FOR JVM-STYLE LANGUAGES

(71) Applicant: Red Hat, Inc., Raleigh, NC (US)

(72) Inventors: Christopher Foley, Waterford (IE); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 101 days.

(21) Appl. No.: 17/874,155

(22) Filed: Jul. 26, 2022

(65) Prior Publication Data
US 2024/0036845 A1  Feb. 1, 2024

(51) Int. Cl.
*G06F 8/60* (2018.01)
*G06F 9/455* (2018.01)
*G06F 11/34* (2006.01)

(52) U.S. Cl.
CPC .......... *G06F 8/60* (2013.01); *G06F 9/45504* (2013.01); *G06F 11/3428* (2013.01)

(58) Field of Classification Search
CPC ..... G06F 8/60; G06F 9/45504; G06F 11/3428
See application file for complete search history.

(56) References Cited

U.S. PATENT DOCUMENTS

| | | | | |
|---|---|---|---|---|
| 8,533,712 B2 * | 9/2013 | Pirvu | ...................... | G06F 9/455 718/1 |
| 9,329,968 B2 * | 5/2016 | Pechanec | ............ | G06F 11/3428 |
| 10,261,818 B2 * | 4/2019 | Blythe | ................ | G06F 9/45558 |
| 11,755,451 B2 * | 9/2023 | Doni | ................... | G06F 11/3409 706/46 |
| 2015/0378752 A1 * | 12/2015 | Stoodley | ............. | G06F 9/44578 717/166 |
| 2016/0088120 A1 * | 3/2016 | Bala | ..................... | G06F 16/9035 707/803 |
| 2019/0361722 A1 * | 11/2019 | Craik | .................. | G06F 16/9014 |
| 2022/0179635 A1 * | 6/2022 | Fang | ...................... | G06N 3/045 |
| 2023/0280996 A1 * | 9/2023 | Torres | ....................... | G06F 8/65 717/168 |
| 2023/0376855 A1 * | 11/2023 | Lange | ................. | G06F 11/3003 |

FOREIGN PATENT DOCUMENTS

| CN | 106687952 A | * | 5/2017 | .......... G06F 16/215 |
|---|---|---|---|---|
| CN | 110888712 A | | 3/2020 | |
| CN | 112231066 A | | 1/2021 | |

(Continued)

OTHER PUBLICATIONS

Arnold, Matthew et al. "Adaptive Optimization in the Jalapeno JVM", ACM SIGPLAN Notices, vol. 46, Issue 4 (Apr. 2011), pp. 65-83.

*Primary Examiner* — Daxin Wu
(74) *Attorney, Agent, or Firm* — Womble Bond Dickinson (US) LLP

(57) ABSTRACT

A continuous optimizer detects a code promotion of a candidate release of an application. In response to the code promotion, the continuous optimizer instantiates a JVM and profiles the application to obtain a JVM profile. The continuous optimizer benchmarks the candidate release against the JVM and JVM profile. The continuous optimizer further compares the benchmark results with previous benchmark results. Based upon the comparison and a set of rules, the continuous optimizer causes the candidate release to be promoted.

20 Claims, 5 Drawing Sheets

(56) References Cited

FOREIGN PATENT DOCUMENTS

| | | | |
|---|---|---|---|
| CN | 112433809 A | 3/2021 | |
| CN | 112579259 A | 3/2021 | |
| CN | 113778740 A | 12/2021 | |
| EP | 1331565 B1 * | 9/2018 | .......... G06F 11/3419 |
| WO | WO-2016159949 A1 * | 10/2016 | ............. G06F 15/16 |

* cited by examiner

PROFILE A CANDIDATE RELEASE OF THE APPLICATION AGAINST A PLURALITY OF JVMs TO IDENTIFY A JVM AND GENERATE A CANDIDATE JVM PROFILE THAT IS CONFIGURED TO ACHIEVE PERFORMANCE GOALS OF THE APPLICATION
310

BENCHMARK THE CANDIDATE RELEASE OF THE APPLICATION WITH THE IDENTIFIED JVM AND THE CANDIDATE JVM PROFILE TO GENERATE BENCHMARK RESULTS
320

APPLY A RULE TO DEPLOY THE IDENTIFIED JVM, THE CANDIDATE JVM PROFILE, AND THE CANDIDATE RELEASE OF THE APPLICATION BASED ON A COMPARISON OF THE BENCHMARK RESULTS WITH PREVIOUS BENCHMARK RESULTS
330

FIG. 3

RUNTIME ENVIRONMENT OPTIMIZER FOR JVM-STYLE LANGUAGES

TECHNICAL FIELD

Aspects of the present disclosure relate to a continuous optimizer architecture for JVM-style languages, and more particularly, to deploying new releases of applications.

BACKGROUND

Software release processing can involve the deployment of large, complex applications. This deployment can involve promoting applications from a development environment to a staging environment, and then to a production environment. The requirements for the environments can change with different versions of the applications.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

FIG. 3 is a flow diagram of a method of using a continuous optimizer architecture, in accordance with some embodiments of the disclosure.

DETAILED DESCRIPTION

Figure 1:
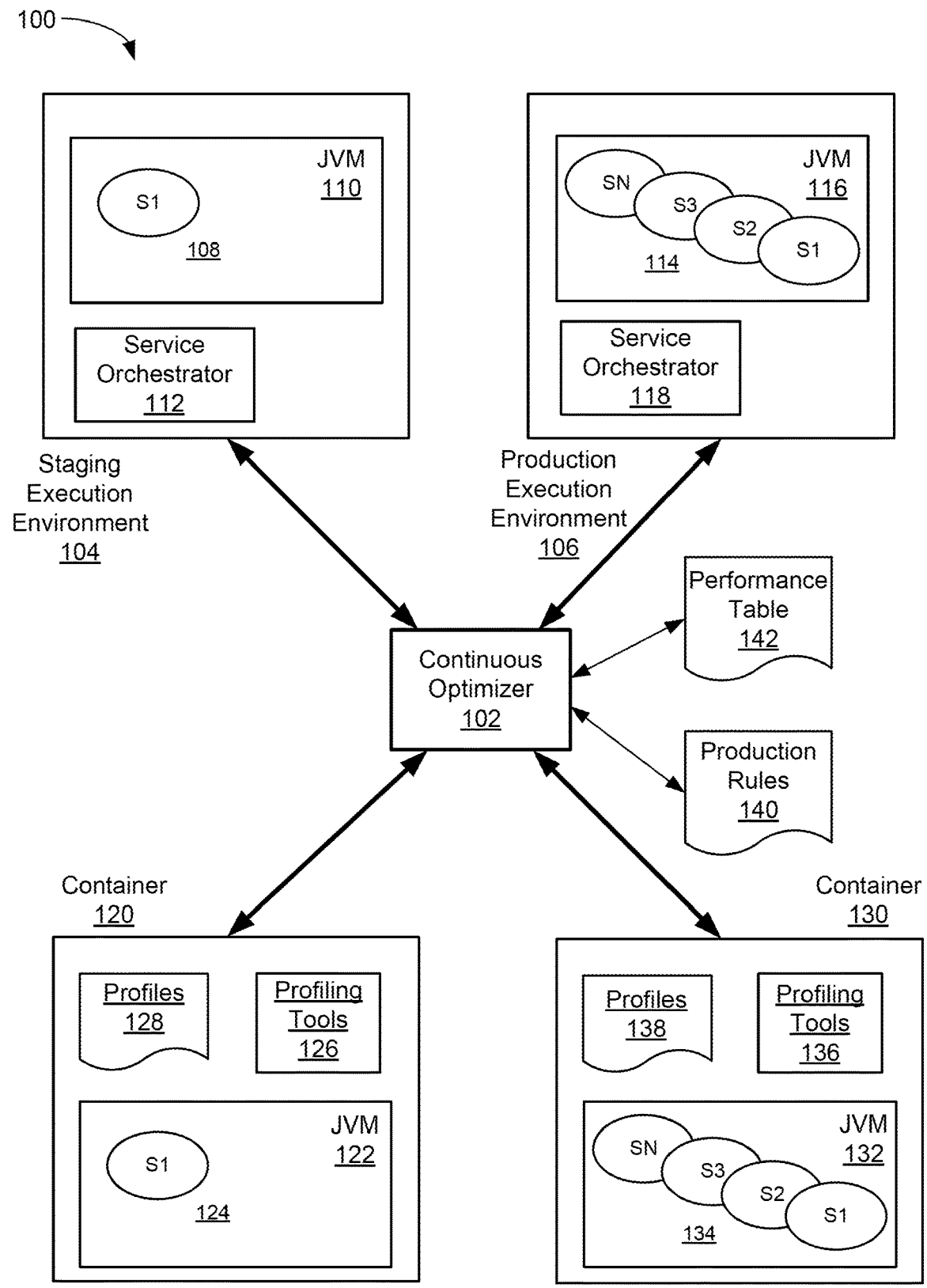
FIG. 1 is an illustration of an example of a continuous optimizer in accordance with embodiments of the disclosure.

For many computer languages that run on virtual machines, e.g., Java on a Java Virtual Machine (JVM), optimizing application performance by tuning the JVM can be a challenge. In many cases, performance tuning can involve tuning at the level of the overall ecosystem rather than at the individual application. Even in environments in which multiple JVMs are running (either natively or in containers), an optimal result can be difficult to achieve. In some cases, a JVM can be run "natively," e.g., execute the JVM on a host, (e.g., "bare metal,") and make all the resources of the host available to the JVM. Alternatively, a JVM can be executed in a container, thereby constraining the resources available to the JVM to those allocated to the container, e.g., memory, processing capacity, and devices. The resources made available to a container can change, while those of a physical machine are fixed without physical hardware changes. Microservices can be particularly difficult to optimize because the number of microservices can rise to a level that does not warrant deploying every microservice to a dedicated JVM or container. In such a situation, the (overhead) cost of running a JVM for every microservice can outweigh the performance benefits of a service-oriented architecture.

Furthermore, fine-tuning an individual application and its execution environment may only be valid for a particular version of that application. The release of a new version of an application, with code or architectural changes, may obviate the tuning and require re-tuning.

Aspects of the disclosure can address the above-noted and other deficiencies by introducing a continuous-optimizer (CO) for languages that can run on a JVM, such as Java. Other such languages can include Scala and Groovy. The use of other languages is contemplated. The CO can monitor the development pipeline and detect code promotions, e.g., from Staging to Production. Upon detection of a code promotion, the CO can instantiate a dedicated container and provision it with JVM profiling tools. The CO can further cause the new release of the application associated with the code promotion to be deployed to the container. The CO can monitor the execution of the application against the profiling tools to determine a set of JVM-related parameters that could result in improved performance of (this version of) the application on the JVM. In some cases, the CO can organize these parameters into a JVM profile that can be stored in a lookup table in a database for subsequent retrieval. In an example, this JVM profile might be called a candidate JVM profile. In some examples, profiling tools may be applied against a variety of JVM candidates resulting in a set of JVM profiles. These different JVMs and their respective JVM profiles can be evaluated to determine JVMs and JVM profiles that provide improved performance.

Sample parameters can include: Heap Size (Min, Max), possibly invoked with -Xms, -Xmx; Metaspace (class information), possibly invoked with -Xmx-XX:MaxMetaspaceSize; and Garbage Collection, possibly invoked with -Xms, -Xmx; -XX:+UseG1GC, -XX:MaxGCPauseMillis, -XX:ParallelGCThreads, -XX:ConcGCThreads, or -XX:InitiatingHeapOccupancyPercent.

The CO can then execute the application on a JVM configured with the JVM profile and benchmark the performance of the application. The benchmark results may include, for example, startup speed, method latency, throughput, garbage collection pause times, application jitteriness, and transactions per second. In some cases, multiple benchmarks may be performed that emphasize different stress tests on the application, e.g., heavy network traffic or a large number of users. These results can be then compared to results obtained from benchmarking previous versions of the application to quantify changes in the performance of the application. In an embodiment, the change in performance of the application can be expressed as a percentage. In some cases, the performance metrics of the previous version of the application is recorded. In other cases, the performance metrics of several versions of the application is retained.

In an example, the CO can consult a lookup table containing rules for deployments. Such a table can contain rules controlling a deployment to a Production environment. An example of a rule is instantiating a dedicated JVM for the application upon a specified percentage increase in the performance of a new release of an application. Alternatively, an increase below the specified percentage (or even a decrease in performance) could suggest that the performance improvement does not justify the overhead of a dedicated JVM. In another example, a decrease in performance could suggest moving from a dedicated JVM or a dedicated container to a JVM or container on which multiple applications are hosted. Another rule could control, based on an improvement in performance of the application, instantiating a dedicated container for the application.

The threshold of performance change for which a new JVM or container is to be instantiated for a new version of an application can change over time, e.g., as a function of the number of hosts in the cloud or the cost of instantiating a new host, container, or JVM.

In another example, rather than deploying the application to a dedicated JVM, the CO can replicate a JVM and the set of applications running on it to a first container. In an example, a JVM and a set of applications may be running in production. In an example, the CO can instantiate a second container and JVM with a candidate JVM profile, then deploy the same set of applications, including a new version of a particular application, to that new JVM. In an embodiment, the CO can benchmark the performance of the two sets of applications against the two JVM profiles. In an example, the CO can benchmark the performance of the set of applications both in aggregate and individually. In an example, if the aggregate score of the set of applications running against the JVM with the candidate JVM profile exceeds that of the aggregate score of the replicated JVM and set of applications, the CO can deploy the JVM, candidate JVM profile, and applications. In an example, this deployment may be made to a production environment. In an embodiment, this comparison may involve a set of different JVMs, each JVM having a candidate JVM profile.

In an embodiment, the aggregate score may involve performance thresholds and weighting. In an example, respect may be given to the performance of one or more key applications, such that even with an aggregate performance improvement, should the individual performance of those key applications decline, the CO will not deploy a new JVM or JVM profile. For example, a rule may state that a performance metric X of application (or service) Y cannot drop below (or exceed) a value Z. In an example, a key application may have multiple performance metrics that can be evaluated. In an example, the CO may implement a rule restricting deployment upon determination of a decline in performance of one or more key applications.

In an example, the CO may evaluate a cross-product of different JVMs, both shared and dedicated, with respective candidate JVM profiles, shared containers, dedicated containers, shared hosts, and dedicated hosts to identify the best aggregate deployment strategy and orchestrate a subsequent deployment. In an example, the CO can cause a production environment of hosts, containers, JVMs, and applications to be enhanced/improved for an ecosystem. In an example, load on that ecosystem can be enhanced/improved across components. In an example, a balance can be struck between maximizing and/or improving performance of individual applications and the overall performance of an ecosystem. In an example, this balance can be maintained incrementally as new applications and new releases of existing applications are made available for deployment.

Although aspects of the disclosure may be described in the context of a staging repository, embodiments of the disclosure may be applied to any computing system that configures multiple collections of software components.

FIG. 1 depicts an example of a continuous optimizer evaluating a new release of an application in accordance with embodiments of the disclosure. As shown in FIG. 1, staging execution environment 104 and production execution environment 106 are accessed by a continuous optimizer 102. In an example, the continuous optimizer 102 determines that a new (candidate) release of application S1, 108, is available for promotion to the production execution environment 106. Candidate release 108 is running on a JVM 110. As later described, the JVM 110 may be running within a virtual machine (VM), within a container, or within a container on a VM. Other configurations are contemplated. Both staging execution environment 104 and production execution environment 106 may contain a service orchestrator 112 and 118, respectively. In an example, a service orchestrator may provide automated configuration, coordination, and management of computer systems and software. In the example shown, applications S1, S2, S3, . . . and SN, as 114, are executing on production execution environment 106, on JVM 116. As in staging execution environment 104, JVM 116 may be running within a VM, within a container, or within a container on a VM.

Upon a notification that a candidate release of an application 108 is available for promotion to the production execution environment 106, the continuous optimizer 102 can instantiate a container 120 with JVM and application profiling tools 126. In an example, the CO can then cause a JVM 122 to be deployed to the container 120 and the candidate release of the application 124 to be executed on the JVM 122. During the execution of the candidate release of the application 124, the profiling tools 126 can derive an enhanced/improved set of JVM parameters for the candidate release of the application 124. In an embodiment, the enhanced/improved set of JVM parameters can be stored as a JVM profile in a set of profiles 128. The CO can then cause the candidate release of the application 124 to run on the JVM with the enhanced/improved set of JVM parameters and collect benchmark results for the candidate release of the application 124 and the enhanced/improved set of JVM parameters. In some cases, one or more new containers may be instantiated to derive the enhanced/improved set of JVM parameters and to benchmark the candidate release of the application 124 against those enhanced/improved JVM parameters. In an embodiment, multiple JVMs, each with their own set of enhanced/improved JVM parameters may be exercised with the candidate release of the application 124. In some cases, a different JVM and enhanced/improved parameters may be found to deliver improved performance. In an embodiment, each set of enhanced/improved JVM parameters may be maintained in the set of profiles 128.

The CO can then compare the benchmarked results for the candidate release of the application 124 and the enhanced/improved JVM parameters against performance information about the current production version of the application and the current production JVM and JVM parameters. In an embodiment, historical performance information for previous releases of an application can be maintained in a performance table 142. In an embodiment, the CO can consult a set of production rules 140 to determine if and how the candidate release of the application 124 should be deployed to the production execution environment 106. In some cases, the CO provides instructions to the service orchestrator 118 in the production execution environment 106 to deploy the candidate release of the application 124 in the production execution environment 106.

In some examples, a production rule could specify that for a performance improvement of a particular amount, a dedicated JVM should be instantiated in the production execution environment 106. In another example, a production rule could specify that for a performance improvement of a particular amount, a dedicated container and JVM should be instantiated in the production execution environment 106. In another example, a production rule could specify that for a performance improvement of a particular amount, a dedicated VM and JVM should be instantiated in the production execution environment 106. In another example, a production rule could specify that a threshold for deployment of a new release of an application is partially dependent on the cost of deployment of a VM, container, or JVM.

In an embodiment, the CO can deploy multiple production applications 134 and their respective profiles 138 into a single JVM 132 with the candidate JVM profile. In an example, the applications 134 can be benchmarked and their performance metrics compared against historical performance metrics recorded in a performance table 142. In an example, if the aggregate performance improvement exceeds a threshold, the CO may deploy the candidate JVM profile to the production execution environment 106. In an example, the CO may use a production rule 140 to restrict such a deployment on a condition that the performance of an individual application declines.

Figure 2:
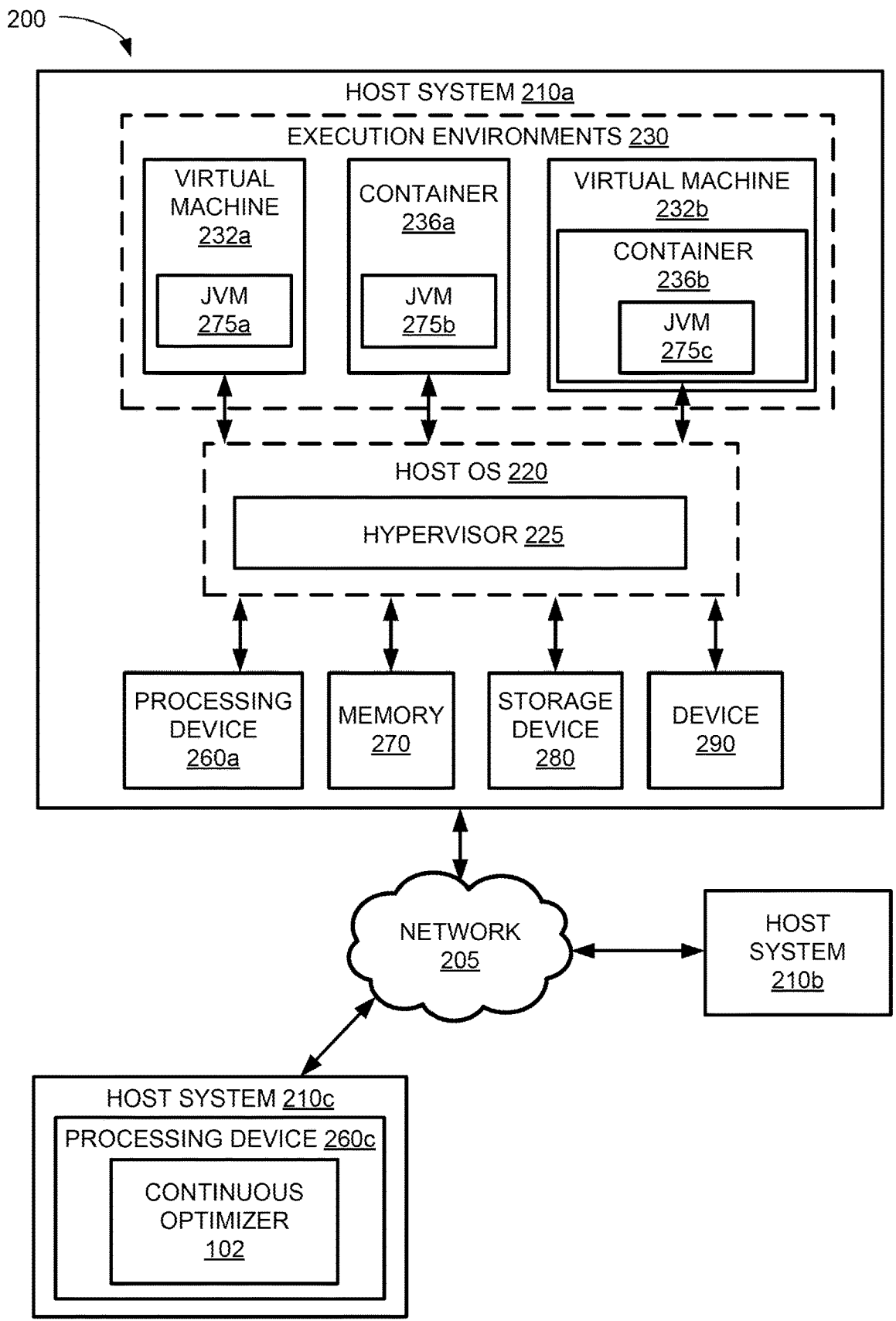
FIG. 2 is a high-level component diagram of an illustrative example of a continuous optimizer architecture, in accordance with embodiments of the disclosure.

FIG. 2 depicts a high-level component diagram of an illustrative example of a continuous optimizer architecture 200, in accordance with one or more aspects of the present disclosure. However, other continuous optimizer architectures 200 are possible, and the implementation of a computer system utilizing examples of the disclosure are not necessarily limited to the specific architecture depicted by FIG. 2.

The continuous optimizer architecture 200 may correspond to the example 100 of FIG. 1. In embodiments, a continuous optimizer architecture 200 may utilize one or more virtual network layers to facilitate communications between different types of execution environments of the continuous optimizer architecture 200. As previously described, the execution environments may be VMs, containers, one or more containers residing within a VM, or any combination thereof.

Referring to FIG. 2, the continuous optimizer architecture 200 includes VMs 232a and 232b, containers 236a and 236b, and JVMs 275a, 275b, and 275c. The JVMs may reside within containers or within VMs as illustrated in FIG. 1. The JVMs may also (not indicated in FIG. 1) reside directly within hosts. The containers may reside within hosts or within VMs as illustrated in FIG. 1. The containers may reside within the same or different VMs on the same or different hosts.

As shown in FIG. 2, continuous optimizer architecture 200 includes host systems 210a, 210b, and 210c. The host systems 210a, 210b, and 210c may include one or more processing devices 260a and 260c, memory 270, which may include volatile memory devices (e.g., random access memory (RAM)), non-volatile memory devices (e.g., flash memory) and/or other types of memory devices, a storage device 280 (e.g., one or more magnetic hard disk drives, a Peripheral Component Interconnect (PCI) solid state drive, a Redundant Array of Independent Disks (RAID) system, a network attached storage (NAS) array, etc.), and one or more devices 290 (e.g., a Peripheral Component Interconnect (PCI) device, network interface controller (NIC), a video card, an I/O device, etc.). In certain implementations, memory 270 may be non-uniform access (NUMA), such that memory access time depends on the memory location relative to processing devices 260a or 260c. It should be noted that although, for simplicity, two processing devices 260a and 260c, and a single storage device 280 and device 290 are depicted in FIG. 2, other embodiments of host systems 210a, 210b, and 210c may include multiple processing devices, storage devices, or devices. Processing devices 260a and 260c may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing devices 260a and 260c may also include one or more special-purpose processing devices such as an application specific integrated circuit (ASIC), a field programmable gate array (FPGA), a digital signal processor (DSP), network processor, or the like.

The host systems 210a, 210b, and 210c may be servers, mainframes, workstations, personal computers (PC), mobile phones, palm-sized computing devices, etc. In some examples, host systems 210a, 210b, and 210c may be separate computing devices. In some examples, host systems 210a, 210b, and 210c may be implemented by a single computing device. For clarity, some components of host systems 210b and 210c are not shown. Furthermore, although continuous optimizer architecture 200 is illustrated as having three host systems, examples of the disclosure may utilize any number of host systems.

Host systems 210a, 210b, and 210c may additionally include execution environments 230, which may include one or more VMs 232a and 232b, containers 236a and 236b, container 236b residing within VM 232b, JVMs 275a, 275b, and 275c, and host operating system (OS) 220. VM 232a and VM 232b are software implementations of machines that execute programs as though they were actual physical machines. Containers 236a and 236b can act as isolated execution environments for different workloads of services, as previously described. JVMs 275a, 275b, and 275c are Java virtual machines that can enable an execution environment to run Java programs as well as programs written in other languages that can be compiled to Java bytecode. Host OS 220 manages the hardware resources of the computer system and can provide functions such as inter-process communication, scheduling, and memory management.

Host OS 220 may include a hypervisor 225 (which may also be known as a virtual machine monitor (VMM)), which provides a virtual operating platform for VMs 232a and 232b and manages their execution. Hypervisor 225 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 225, though typically implemented in software, may emulate and export a bare machine interface to higher level software in the form of virtual processors and guest memory. Higher level software may comprise a standard or real-time OS, may be a highly stripped-down operating environment with limited operating system functionality, and may or may not include traditional OS facilities, etc. Hypervisor 225 may present other software (e.g., "guest" software) the abstraction of one or more VMs that provide the same or different abstractions to various guest software (e.g., guest operating system, guest applications). It should be noted that in some alternative implementations, hypervisor 225 may be external to host OS 220, rather than embedded within host OS 220, or may replace host OS 220.

The host systems 210a, 210b, and 210c are coupled to each other (e.g., may be operatively coupled, communicatively coupled, may communicate data/messages with each other) via network 205. Network 205 may be a public network (e.g., the internet), a private network (e.g., a local area network (LAN) or wide area network (WAN)), or a combination thereof. In one embodiment, network 205 may include a wired or a wireless infrastructure, which may be provided by one or more wireless communications systems, such as a WiFi™ hotspot connected with the network 205 and/or a wireless carrier system that can be implemented using various data processing equipment, communication towers (e.g., cell towers), etc. The network 205 may carry communications (e.g., data, message, packets, frames, etc.) between the various components of host systems 210*a*, 210*b*, and 210*c*.

In embodiments, host system 210*c* may employ a continuous optimizer 102 using a processing device 260*c* to promote one or more applications from host system 210*a* to host system 210*b*. The CO may identify commands to be executed at host system 210*a* and/or host system 210*b*. The promotion may identify files to be uploaded from host system 210*a* to host system 210*b*. Further details regarding the CO will be discussed below.

FIG. 3 is a flow diagram of a method 300 of promoting a new release of an application using a continuous optimizer architecture, in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 300 may be performed by execution environments 230 of FIG. 2.

With reference to FIG. 3, method 300 illustrates example functions used by various embodiments. Although specific function blocks ("blocks") are disclosed in method 300, such blocks are examples. That is, examples are well suited to performing various other blocks or variations of the blocks recited in method 300. It is appreciated that the blocks in method 300 may be performed in an order different than presented, and that not all of the blocks in method 300 may be performed.

Method 300 begins at block 310, where the processing logic obtains a candidate release of an application. In an example, the candidate release of the application may be obtained as a result of a CO receiving a notification that the candidate release of the application is ready for promotion from one execution environment to another execution environment. In some cases, the notification may come from a service orchestrator such as service orchestrator 112 in FIG. 1. In some examples, the CO may actively monitor an execution environment of a development pipeline to determine that a candidate release of an application is ready for promotion.

In an example, upon the determination of a candidate release, the processing logic can cause a CO to instantiate a new container, deploy a JVM and JVM profiling tools to the container, and deploy the candidate release of the application to the container. In an example, the processing logic may cause a CO to deploy a JVM and JVM profiling tools to an existing container. In an example, the processing logic may cause the CO to deploy a JVM and JVM profiling tools to a VM. In an example, the processing logic may cause the CO to deploy a JVM and JVM profiling tools to a VM within a container. In an example, the processing logic may cause the CO to deploy a JVM and JVM profiling tools to a host.

The processing logic causes the CO to profile the candidate release of the application against a plurality of JVMs. The CO can monitor the execution of the candidate release of the application against the profiling tools to determine a set of JVM-related parameters that could result in improved performance of the candidate release of the application on a JVM. In an example, the processing logic can store these parameters into one or more JVM profiles. In some cases, the processing logic can cause the CO to store a JVM profile in a lookup table in a database for later retrieval. In some cases, the processing logic may exercise the candidate release of the application against different JVMs to produce a set of JVM profiles.

At block 320, the processing logic causes the CO to benchmark the candidate release of the application against an identified JVM and a JVM profile, which can also be referred to as a candidate JVM profile. In some cases, the processing logic may cause the CO to perform multiple benchmarks to stress different parts of the application. In some cases, the processing logic may cause the CO to perform benchmarks of the application against different JVMs and JVM profiles.

At block 330, the processing logic compares the benchmark results with previous benchmark results. The CO can compare the results of these benchmarks to results obtained from benchmarks performed against previous versions of the application. In an embodiment, the results of these benchmarks can be recorded. In some cases, the difference in the benchmark results can be expressed as a percentage.

The processing logic applies a rule to deploy a JVM that has been identified as achieving performance goals for the application, a candidate JVM profile, and the candidate release of the application. In some cases, the processing logic can cause the CO to query a lookup table containing rules for deployments. In an example, such rules can control deployments to specific environments, e.g., Production. An example of a rule is instantiating a dedicated JVM for the application upon a specified percentage increase in the performance of a new release of an application. Alternatively, a rule could state that an increase below the specified percentage (or even a decrease in performance) does not justify the overhead of a dedicated JVM. Another rule could control, based on an improvement in performance of the application, instantiating a dedicated container for the application.

In an example, rules involving a threshold of performance change for which a new JVM or container is to be instantiated for a new version of an application can allow the threshold to change over time, e.g., as a function of the number of hosts in the cloud or the cost of instantiating a new host, container, or JVM.

In another example, a rule could state that rather than deploying the application to a dedicated JVM, the processing logic can cause the CO to replicate a JVM and the set of applications running on it to a first container. In an example, a JVM and a set of applications may be running in production. In an example, the CO can instantiate a second container and JVM with a candidate JVM profile, then deploy the same set of applications, including a new version of a particular application, to that new JVM. In an embodiment, the CO can benchmark the performance of the two sets of applications against the two JVM profiles. In an example, the CO can benchmark the performance of the set of applications both in aggregate and individually. In an example, if the aggregate score of the set of applications running against the JVM with the candidate JVM profile exceeds that of the aggregate score of the replicated JVM and set of applications, a rule could direct the CO to deploy the JVM, candidate JVM profile, and applications. In an example, this deployment may be made to a production environment. In an embodiment, this comparison may involve a set of different JVMs, each JVM having a candidate JVM profile.

In an embodiment, the aggregate score may involve performance thresholds and weighting. In an example, a rule may prioritize the performance of one or more key applications, such that even with an aggregate performance improvement, should the individual performance of those key applications decline, the CO will not deploy a new JVM or JVM profile. For example, a rule may state that a performance metric X of application (or service) Y cannot drop below (or exceed) a value Z. In an example, a key application may have multiple performance metrics that can be evaluated. In an example, the CO may implement a rule restricting deployment upon determination of a decline in performance of one or more key applications.

In an example, the CO may evaluate a cross-product of different JVMs, both shared and dedicated, with respective candidate JVM profiles, shared containers, dedicated containers, shared hosts, and dedicated hosts to identify the best aggregate deployment strategy and orchestrate a subsequent deployment. In an example, observance of a rule can cause the CO to optimize an execution environment of hosts, containers, JVMs, and applications for an ecosystem. In an example, such a rule can optimize load on that ecosystem across components.

Figure 4:
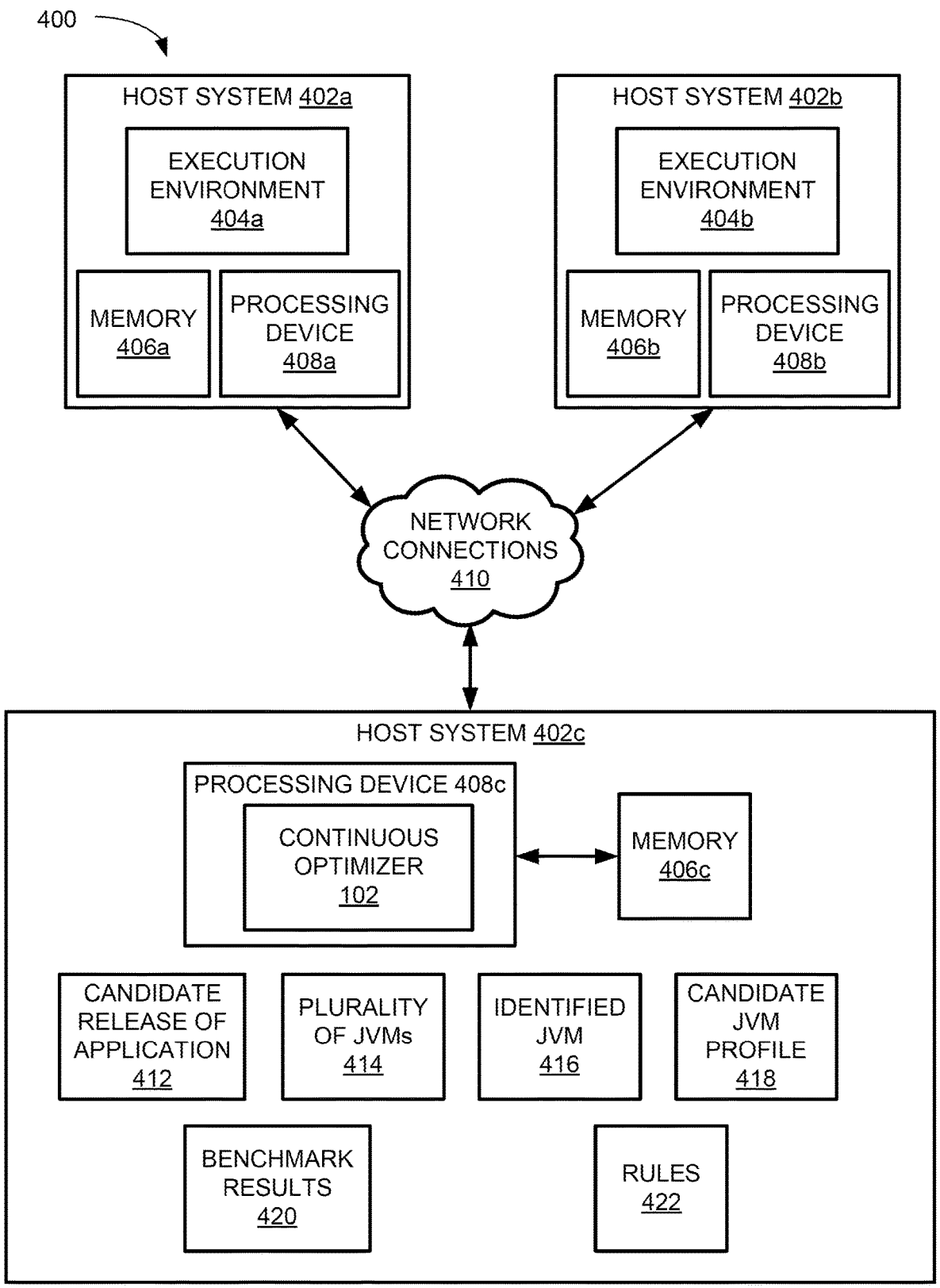
FIG. 4 is a component diagram of an example continuous optimizer architecture, in accordance with some embodiments of the disclosure.

FIG. 4 is a component diagram of an example continuous optimization architecture 400, in accordance with one or more aspects of the present disclosure. However, other continuous optimization architectures are possible, and the implementation of a computer system utilizing examples of the disclosure are not limited to the specific architecture depicted by FIG. 4. Host systems 402a and 402b may include execution environments 404a and 404b, respectively, similar to execution environment 230 as shown in FIG. 2. Host systems 402a, 402b, and 402c may also include memory 406a, 406b, and 406c respectively, similar to memory 270 as shown in FIG. 2. Host systems 402a, 402b, and 402c may also include processing devices 408a, 408b, and 408c, similar to processing devices 260a and 260c, as shown in FIG. 2.

The memory 406a and 406b may include volatile memory devices, e.g., random-access memory (RAM), non-volatile memory devices, e.g., flash memory, and/or other types of memory devices. In certain implementations, memory 406a and 406b may be non-uniform access (NUMA), such that memory access time depends on the memory location relative to processing devices 408a and 408b. It should be noted that although, for simplicity, a single processing device 408a and memory 406a are depicted in host system 402a of FIG. 4, other embodiments of host systems 402a and 402b may include multiple processing devices, storage devices, or devices. Processing device 408a and 408b may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing devices 408a, 408b, and 408c may also include one or more special-purpose processing devices such as an application specific integrated circuit (ASIC), a field programmable gate array (FPGA), a digital signal processor (DSP), network processor, or the like.

In an example, host system 402c may support a continuous optimizer 102. In an example, host system 402c may include a candidate release of an application 412. Continuous optimizer 102 and candidate release 412 may correspond to continuous optimizer 102 and candidate release 108, respectively, of FIG. 1. In the example, host system 402c may include a plurality of JVMs 414. The plurality of JVMs 414 may correspond to JVMs 122 or 132 of FIG. 1. In the example, host system 402c may support an identified JVM 416. In the example, host system 402c may support a candidate JVM profile 418. The candidate JVM profile 418 may correspond to JVM profiles 128 or 138 of FIG. 1. Host system 402c may also include benchmark results 420. Benchmark results 420 may include current and historical benchmark results. Host system 402c may further include rules 422. Rules 422 may correspond to production rules 140 of FIG. 1.

The host systems 402a, 402b, and 402c may be a server, a mainframe, a workstation, a personal computer (PC), a mobile phone, a palm-sized computing device, etc. In some examples, host systems 402a, 402b, and 402c may be separate computing devices. In some examples, host systems 402a, 402b, and 402c may be implemented by a single computing device. For clarity, some components of host systems 402a, 402b, and 402c are not shown. Furthermore, although continuous optimization architecture 400 is illustrated as having three host systems, examples of the disclosure may utilize any number of host systems.

It should be noted that continuous optimizer 102, candidate release of the application 412, plurality of JVMs 414, identified JVM 416, candidate JVM profile 418, benchmark results 420, and rules 422 are shown for illustrative purposes only and are not physical components of host systems 402a, 402b, or 402c.

Figure 5:
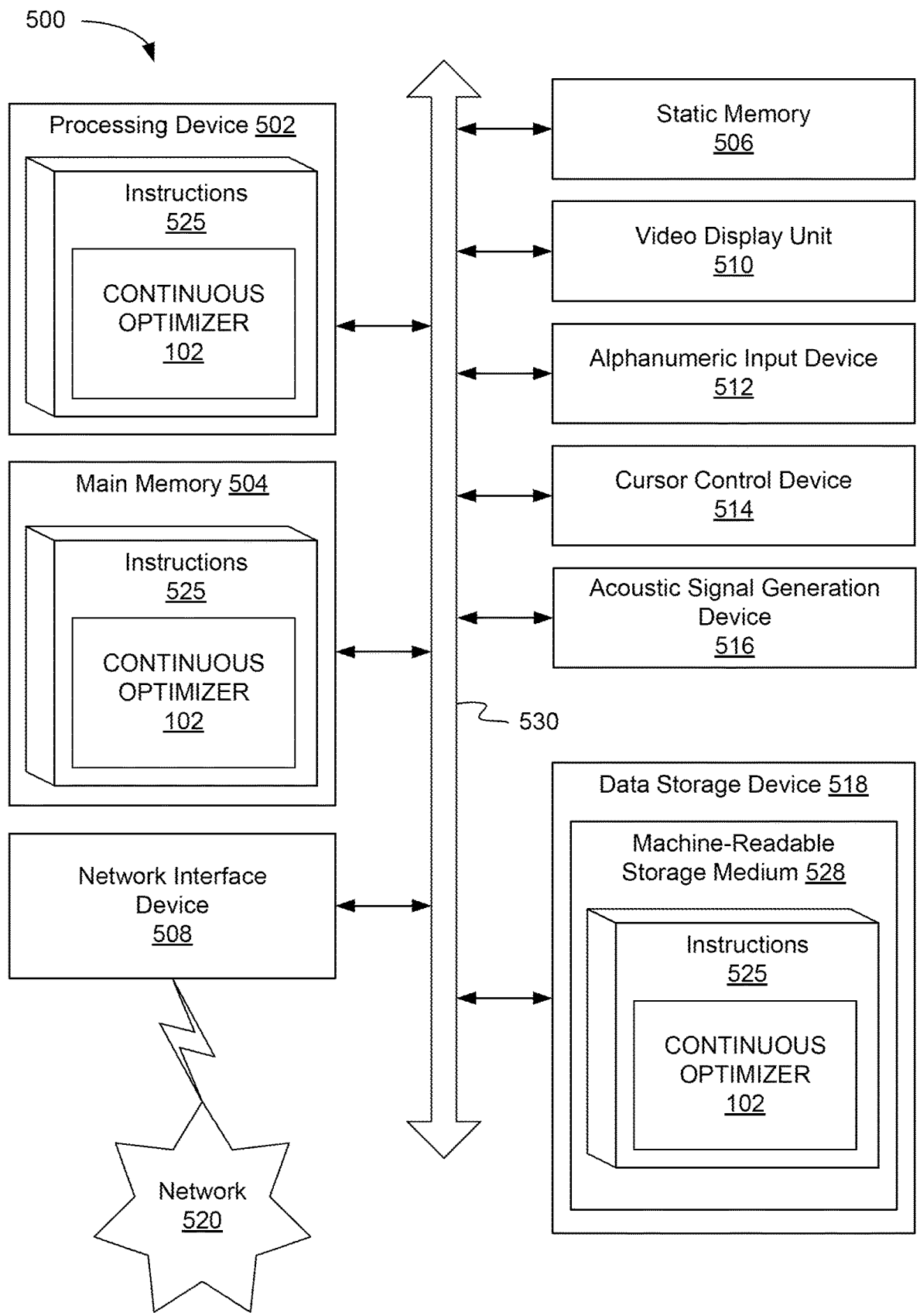
FIG. 5 is a block diagram of an example apparatus that may perform one or more of the operations described herein, in accordance with some embodiments of the disclosure.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general-purpose processor, a PLD, etc.) 502, a main memory 504 (e.g., synchronous dynamic random-access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also include one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions 525 that may include instructions for a continuous optimizer 102 for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "deploying," "profiling," "benchmarking," "applying," "receiving," "configuring," "identifying," "transmitting," "storing," "instantiating," "detecting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times, or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended to not invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for deploying a release of an application, the method comprising:
profiling a candidate release of the application against a plurality of Java virtual machines (JVMs) to identify a JVM and generate a candidate JVM profile that is configured to achieve performance goals of the application;
benchmarking the candidate release of the application with the identified JVM and the candidate JVM profile to generate benchmark results; and
applying a rule to deploy the identified JVM, the candidate JVM profile, and the candidate release based on a comparison of the benchmark results with previous benchmark results.

2. The method of claim 1, wherein the identified JVM executes in one of:
a container;
a virtual machine; or
a container within a virtual machine.

3. The method of claim 1, wherein:
a plurality of additional applications are benchmarked against the identified JVM and the candidate JVM profile to generate additional benchmark results; and
the rule is further based upon a comparison of the additional benchmark results with previous benchmark results for the plurality of additional applications.

4. The method of claim 1, wherein the benchmark results include at least one of: startup speed; method latency; throughput; garbage collection pause times; application jitteriness; or transactions per second.

5. The method of claim 1, wherein the identified JVM, the candidate JVM profile, and the candidate release are deployed by a service orchestrator.

6. The method of claim 1, wherein the identified JVM to which the candidate release is deployed comprises a plurality of deployed applications.

7. The method of claim 1, wherein the rule prioritizes a performance metric of the candidate release.

8. A system comprising:
a memory; and
a processing device, operatively coupled to the memory, to:
profile a candidate release of an application against a plurality of Java virtual machines (JVMs) to identify a JVM and generate a candidate JVM profile that is configured to achieve performance goals of the application;
benchmark the candidate release of the application with the identified JVM and the candidate JVM profile to generate benchmark results; and
apply a rule to deploy the identified JVM, the candidate JVM profile, and the candidate release, based on a comparison of the benchmark results with previous benchmark results.

9. The system of claim 8, wherein the identified JVM executes in one of:
a container;
a virtual machine; or
a container within a virtual machine.

10. The system of claim 8, wherein:
a plurality of additional applications are benchmarked against the identified JVM and the candidate JVM profile to generate additional benchmark results; and
the rule is further based upon a comparison of the additional benchmark results with previous benchmark results for the plurality of additional applications.

11. The system of claim 8, wherein the benchmark results include at least one of: startup speed; method latency; throughput; garbage collection pause times; application jitteriness; or transactions per second.

12. The system of claim 8, wherein the identified JVM, candidate JVM profile, and candidate release are deployed by a service orchestrator.

13. The system of claim 8, wherein the identified JVM to which the candidate release is deployed comprises a plurality of deployed applications.

14. The system of claim 8, wherein the rule prioritizes a performance metric of the candidate release.

15. A non-transitory computer-readable storage medium including instructions that, when executed by a processing device, cause the processing device to:
profile a candidate release of an application against a plurality of Java virtual machines (JVMs) to identify a JVM and generate a candidate JVM profile that is configured to achieve performance goals of the application;
benchmark the candidate release of the application with the identified JVM and the candidate JVM profile to generate benchmark results; and
apply a rule to deploy the identified JVM, the candidate JVM profile, and the candidate release, based on a comparison of the benchmark results with previous benchmark results.

16. The non-transitory computer-readable storage medium of claim 15, wherein the instructions further cause the identified JVM to execute in one of:
a container;
a virtual machine; or
a container within a virtual machine.

17. The non-transitory computer-readable storage medium of claim 15, wherein:
a plurality of additional applications are benchmarked against the identified JVM and the candidate JVM profile to generate additional benchmark results; and
the rule is further based upon a comparison of the additional benchmark results with previous benchmark results for the plurality of additional applications.

18. The non-transitory computer-readable storage medium of claim 17, wherein the benchmark results include at least one of: startup speed; method latency; throughput; garbage collection pause times; application jitteriness; and transactions per second.

19. The non-transitory computer-readable storage medium of claim 17, wherein the instructions further cause a service orchestrator to deploy the identified JVM, candidate JVM profile, and candidate release.

20. The non-transitory computer-readable storage medium of claim 17, wherein the instructions prioritize a performance metric of the candidate release.

\* \* \* \* \*